United States Patent [19]

Bassett

[11] Patent Number: 5,511,583

[45] Date of Patent: Apr. 30, 1996

[54] COMPRESSOR VALVE

[75] Inventor: H. Eugene Bassett, Houston, Tex.

[73] Assignee: Dover Resources, Inc., Tulsa, Okla.

[21] Appl. No.: 377,164

[22] Filed: Jan. 24, 1995

[51] Int. Cl.$^6$ ................................................ F16K 15/08
[52] U.S. Cl. .................. 137/543.23; 137/543.19; 137/512.1
[58] Field of Search ............... 137/512.1, 543.19, 137/543.23

[56] References Cited

U.S. PATENT DOCUMENTS

| | | | |
|---|---|---|---|
| 1,481,691 | 1/1924 | Chew et al. | 137/512.1 |
| 2,087,407 | 7/1937 | Jones | 137/512.1 |
| 3,124,152 | 3/1964 | Payne | 137/512.1 |
| 3,148,697 | 9/1964 | Carr | 137/512.1 |
| 3,536,094 | 10/1970 | Manley, Jr. | 137/512.1 |
| 3,602,247 | 8/1971 | Bunn et al. | 137/512.1 X |
| 3,701,361 | 10/1972 | Bunn et al. | 137/512.1 |
| 3,786,834 | 1/1974 | Garland | 137/512.1 X |
| 3,829,253 | 8/1974 | Bunn et al. | 137/512.1 X |
| 4,018,247 | 4/1977 | Carr | 137/512.1 |
| 4,184,508 | 1/1980 | Mayer | 137/512.1 |
| 4,278,106 | 7/1981 | Cunningham | 137/512.1 |
| 4,307,751 | 12/1981 | Mayer | 137/512.1 |
| 4,483,363 | 11/1984 | Madoche et al. | 137/512.1 X |
| 4,489,752 | 12/1984 | Deminski | 137/512.1 |
| 4,526,195 | 7/1985 | Humphrey et al. | 137/512.1 |
| 4,607,660 | 8/1986 | Bannitt | 137/512.1 |
| 4,819,689 | 4/1989 | Owsley | 137/512.1 |
| 4,872,481 | 10/1989 | Shaw | 137/512.1 X |
| 4,924,906 | 5/1990 | Hrabal | 137/512.1 |
| 5,052,434 | 10/1991 | Bauer | 137/512.1 X |

OTHER PUBLICATIONS

Photos depicting Assignee's more recent commercial embodiments, date unknown.

Primary Examiner—John Rivell
Attorney, Agent, or Firm—Browning, Bushman, Anderson & Brookhart

[57] ABSTRACT

A valve for intake or exhaust of gas with respect to a compressor comprises a seating plate and a guard plate releasably attached in opposed relation. The seating plate has a plurality of clusters of holes extending from an outer side of the seating plate thereinto, the holes of each cluster being arranged along a respective circular locus and communicating with respective seating surfaces opening through an inner side of the seating plate. The clusters are non-concentrically spaced from one another about the seating plate. The guard plate defines a respective stop surface generally opposed to but spaced from the seating surfaces associated with each such cluster of holes. The guard plate also has flow passages therethrough from an inner side thereof to an outer side and communicating with the spaces between the stop surfaces and the seating surfaces. A respective annular seal ring is reciprocable between each stop surface and the respective opposed seating surfaces and has sealing surfaces sized and shaped to engage and seal against the respective seating surfaces. A plurality of springs carried by the guard plate each engage a respective one of the seal rings to bias the seal ring toward its seating surfaces.

28 Claims, 3 Drawing Sheets

COMPRESSOR VALVE

BACKGROUND OF THE INVENTION

The present invention pertains to valves which may be used for intake or exhaust of gases from compressors, and more specifically, to reciprocating compressors. The operative portion of such a compressor includes at least one piston and cylinder assembly, and the intake and exhaust valves are typically located at or near the cylinder head. It is known to use the same form of valve for both intake and exhaust, simply reversing the position of the valve for the two uses, respectively.

One such valve is disclosed in Assignee's prior U.S. Pat. No. 3,536,094. This valve has two annular valve elements arranged concentrically with respect to each other and to the valve as a whole, and each reciprocating between stop surfaces and valve seating surfaces formed, respectively, on opposed plates forming the valve case. Each valve element is biased closed, i.e. toward its seating surfaces by a plurality of springs circumferentially spaced thereabout. In an alternate embodiment, the two annular valve elements are integrated by interconnecting them with small radially extending webs.

In some of assignee's more recent commercial embodiments of this valve, the plate defining the seating surfaces has a plurality of tabs or flanges extending inwardly adjacent the outer diameter of each respective set of seating surfaces, and circumferentially spaced thereabout, to guide the seal rings in their reciprocatory movement.

In such prior valves, it is very preferable that the valve elements be formed of a hard plastic material, rather than metal, for reasons more fully explained in the prior patent specification.

Although Assignee's prior valves according to U.S. Pat. No. 3,536,094 continue to be highly successful, they tend to be directed primarily to specialty markets. One reason for this is that the hard plastic material of which the valve elements are formed must be of a relatively expensive, high impact, heat, and chemical resistant material, and the valve elements are of such various sizes that they must be custom made; the sizes of the valve elements must be tailored to various size valves.

There have been suggestions in the prior art to utilize a plurality of poppet-type valves, incorporated in a single valve case, for such compressor intake and exhaust. An example is described in U.S. Pat. No. 4,489,752 to Deminski.

Historically, poppet valves have only been successful in low differential pressure applications (300–400 psi) at relatively low speeds (300–400 compressor strokes/minute). The valve elements of traditional poppet valves are more or less mushroom shaped, with the head of the mushroom defining the sealing surface for engagement with the valve seat, and the stem of the mushroom being utilized for guidance of the valve element in its reciprocatory movement.

It is desirable, in these valves, to minimize pressure drop and differential pressure. High differential pressure can cause extrusion of the valve element into the seat flow holes. Achieving low pressure drop typically requires a relatively high "lift" or reciprocatory stroke of the poppet. The high lift can work with the seat flow hole diameter to provide a relatively large available flow area for the gases. Reducing the seat flow hole diameter can help to prevent such extrusion, but only at a penalty of loss of efficiency. Thus, relatively large diameter seat flow holes are typically used, and even then, they must be accompanied by a relatively high poppet lift, as reductions in lift likewise tend to decrease efficiency. In short, there is a balancing act involved in utilizing poppets for this type of application, and it has traditionally been balanced successfully only in the aforementioned low differential pressure and low speed applications.

The Deminski patent seeks to address some of these problems by reducing the overhang of the traditional mushroom form and by a special aerodynamic shape of the upper part of the poppet or valve element.

The current and apparent future trend in the compressor art toward higher operational speeds would appear to further militate against the use of poppet-type valves with such compressors.

SUMMARY OF THE INVENTION

However, in accord with the present invention there has been devised a unique form of multiple poppet type valve which can be produced much less expensively than Assignee's prior valves, can be used in high speed compressors, and allows the poppet lift to be reduced to one-half of what would normally be required (with conventional prior art poppets) in order to obtain a given flow area for the gases.

More specifically, a compressor intake or exhaust valve according to the present invention comprises a seating plate and a guard plate releasably attached in opposed relation to make up the valve case. The seating plate has a plurality of clusters of holes extending from an outer side of the seating plate thereinto. The holes of each cluster are arranged along a respective ring-shaped, preferably circular or annular, locus, and communicate with respective seating surfaces opening through the inner side of the seating plate. The clusters are spaced from one another circumferentially and/ or radially relative to the case as a whole; they are not concentric.

The guard plate defines a respective stop surface generally opposed to but spaced from the seating surfaces associated with each such cluster of holes. The guard plate also has flow passages therethrough from the inner to the outer side thereof and communicating with the spaces between the stop surfaces and the seating surfaces. A respective valve element or poppet is associated with each cluster, and is correspondingly ring-shaped, preferably annular. These poppets or seal rings are reciprocable between the stop surfaces and the respective opposed seating surfaces and have sealing surfaces sized and shaped to engage and seal against the respective seating surfaces. A plurality of springs carried by the guard plate each engages a respective one of the seal rings to bias the seal ring toward the respective sealing surfaces.

Because, when the valve is open, i.e. when the seal rings are against their stop surfaces and spaced from their seating surfaces, gases can flow both interiorly and exteriorly of the seal ring, a given flow area can be provided with approximately half the normally required lift or travel.

The seal rings need not be fully customized, but can be off the shelf items, or machined from off the shelf items, thereby decreasing production costs. Furthermore, a single size of seal ring can be used not only throughout a given valve, but for a range of valves of different sizes, simply adding additional poppets to larger sized valves in the range.

Because gases can flow along both the inner and outer diameters of the seal rings, they tend to be self centering, and will not ordinarily require positive guidance in their reciprocatory movement. However, the respective spring for each seal ring, which is preferably coaxial therewith, can provide additional mechanical guidance. Furthermore, in some embodiments, guide flanges may extend inwardly adjacent the seating surfaces to provide positive mechanical guidance for the seal rings throughout their entire travel or stroke. If the seating surfaces and guide flanges are formed on separate seat members mounted in the seating plate, the seal rings will be self centering with respect to their seats, even if the seat members should become laterally displaced with respect to the main body of the seating plate. This eliminates one of the problems previously encountered in attempting to provide replaceable seat members in poppet-type valves. Such a separate seat member can be firmly fixed in the longitudinal directional mode by use of a resilient loading device compressed between each seat member and the guard plate to urge the seat member tightly into a respective recess in the seating plate.

Various objects, features and advantages of the invention will be made apparent by the following detailed description, the drawings, and the claims.

DETAILED DESCRIPTION

Figure 1:
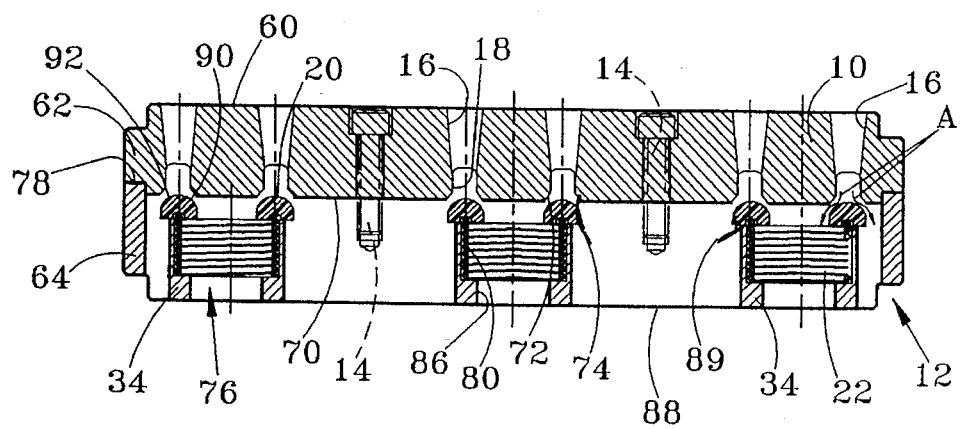
FIG. 1 is a longitudinal cross-sectional view of a first embodiment of the present invention taken along the line 1—1 in FIG. 2.
Figure 2:
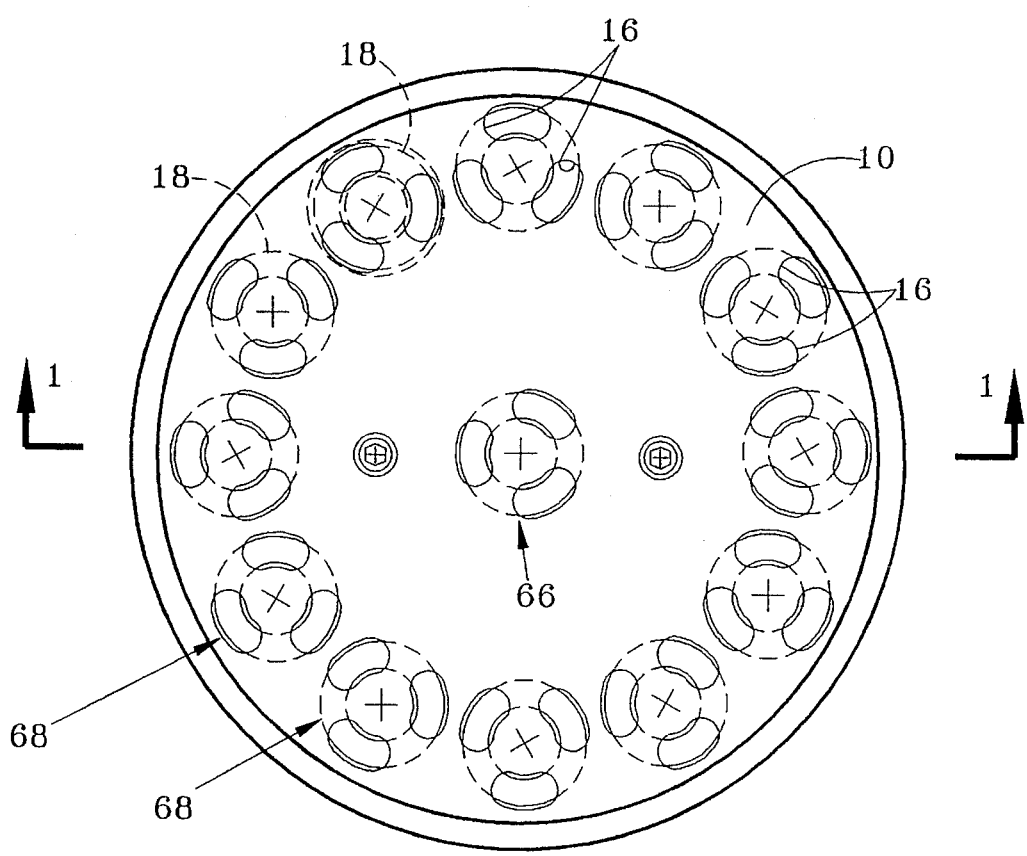
FIG. 2 is a top plan view of the device of FIG. 1.
Figure 3:
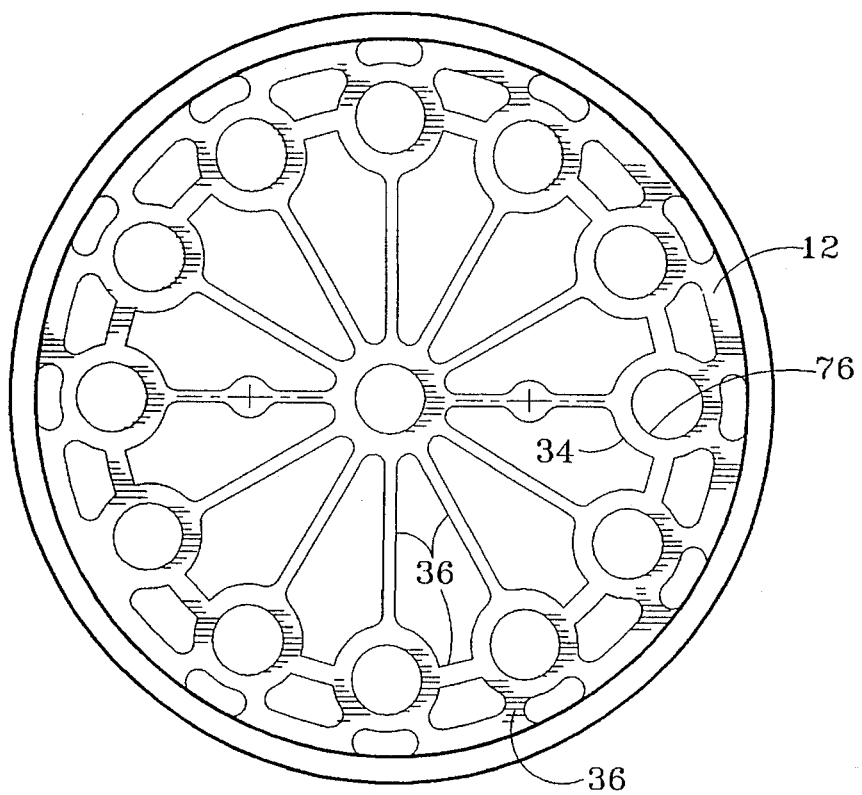
FIG. 3 is a bottom plan view of the device of FIGS. 1 and 2

FIGS. 1–3 illustrate a first embodiment of compressor valve according to the present invention. As shown, this, and all the other embodiments disclosed herein, is oriented for use as an intake valve. However, it would be possible to use precisely the same form of valve as an exhaust valve by simply reversing its orientation, vertically as shown in the drawings, as is well known in the art. The valve comprises as seating plate 10 and a guard plate 12 secured together in opposing relation by screws 14 to form the valve case. Plate 10 has its thickness reduced at the periphery of its outer side 60 to form an annular, radially projecting flange 62. Similarly, plate 12 has its thickness reduced adjacent the periphery of its outer side to form an abutting radially projecting annular flange 64 of like width as flange 62 and aligned therewith. Thus, the flanges 62 and 64, in the assembly, jointly form a flange whereby the valve case may be mounted in, for example, the cylinder head of a reciprocating gas compressor, as is well known in the art.

Comparing FIGS. 1 and 2, it can be seen that the seating plate 10 has a plurality of clusters of holes 16 extending longitudinally into the plate from its outer side 60. More specifically, each such cluster comprises three holes 16 in the form of arcuate slots lying along a common circular or annular locus. There is a central cluster 66. Spaced radially outwardly from cluster 66, and circumferentially from one another, are other clusters 68. The slots 16 are not only arcuate, when viewed in plan, but, as viewed longitudinally in FIG. 1, have their widths tapering inwardly from the outer side 60 of plate 10 toward its inner side 70. The slots 16 terminate short of inner side 70, and the slots 16 of each cluster intersect a common annular aperture 18 which opens through the inner side 70 of plate 10, and the inner portion of which defines seating surfaces, more specifically, an inner annular seating surface 72 and an outer annular seating surface 74, adjacent the inner and outer diameters, respectively, of annular aperture 18. These seating surfaces are preferably tapered away from each other as they progress toward the inner side 70 of plate 10. They may, for example, define either spherical or conical loci. However, they could be flat, downwardly facing surfaces.

The guard plate 12 includes a plurality of cylindrical guides 34. The interior of each guide 34 provides a port 76 generally aligned with a respective one of the clusters of slots 16 and its respective annular aperture 18. The inner side 78 of rim 35 of plate 12 abuts the inner side 70 of plate 10, but guides 34 do not. Except for guides 34 and sufficient interconnecting members 36 to connect cylinders 34 to the plate rim 35, plate 12 is completely open.

Each of the ports 76 has two sections or portions: a relatively large diameter portion 80 sized to slideably receive a helical coil spring 22, and a smaller diameter portion 86 opening outwardly through the outer side 88 of plate 12. Between portions 80 and 82, there is formed a shoulder on which spring 22 rests, and which serves as a spring reaction shoulder. The top of guide 34 provides an annular stop surface 89 spaced from the inner side 70 of plate 10.

An annular seal ring 20 is reciprocable between each of the annular stop surfaces 89 and the respective seating surfaces 72 and 74. The side of ring 20 which faces and, when the valve is closed, abuts seating surfaces 72 and 74, has sealing surfaces 90 and 92 adjacent its inner and outer diameters, respectively, and inclined toward each other, to generally correspond to the taper of seating surfaces 72 and 74. Preferably, if surfaces 72 and 74 define spherical loci, surfaces 89 and 92 define mating spherical loci; if surfaces 72 and 74 define conical loci, surfaces 89 and 92 preferably define mating conical loci; etc. However, other arrangements are possible. For example, surfaces 72 and 74 could define conical loci, with surfaces 89 and 92 defining spherical loci tangent to the respective conical loci.

The other side of ring 20 is generally planar for abutment with stop surface 89. However, approximately midway between its inner and outer diameters, that side of ring 20 is provided with an annular recess which receives one end coil of the respective spring 22. Ring 22 can travel between a closed position engaging seating surfaces 72 and 74, and an open position engaging stop surface 89. As is known in the art, spring 22 will normally urge ring 20 into its closed position. However, whenever the pressure in the adjacent end of the compressor cylinder, and thus in the ports 76, is lower than the pressure of the gas being taken in, i.e. the pressure in slots 16 and apertures 18, to a sufficient degree to overcome the springs 22, the valves will open. When these pressure conditions are reversed, the valves will again be closed by their springs 22.

The sealing rings or valve elements 20 can be machined from off the shelf rings of hard plastic, and more specifically, of a polymeric material which is high impact resistant, as well as chemical and heat resistant. All of the rings 20 are of the same size, and if there is a range of valves similar to that shown in FIGS. 1–3, but of different sizes, it is only necessary to increase or decrease the number of clusters, seal rings, etc. to allow for larger and smaller sizes in the valve range. Thus, the ring size can be standardized not only for a given valve, but for the entire size range.

Other than from its spring 22, each ring 20 receives no positive mechanical guidance in its travel. However, it is self aligning with its respective seating surfaces 72 and 74 for several reasons. First, because of the construction of guard plate 30, incoming gas can flow along both the inner and outer diameters of ring 20 and guide 34, as shown by the arrows A in FIG. 5. This helps to center the ring 20. Furthermore, as mentioned, there is a substantial amount of guidance from spring 22, which in turn is guided by the inner diameter of the enclosing portion of cylinder 34. Finally, once the ring 20 begins to move into alignment with its seating surfaces 72 and 74, the tapers of the seating surfaces and the sealing surfaces on the ring 20, will, so to speak, cam the ring 20 into proper alignment with its seating surfaces.

Figure 4:
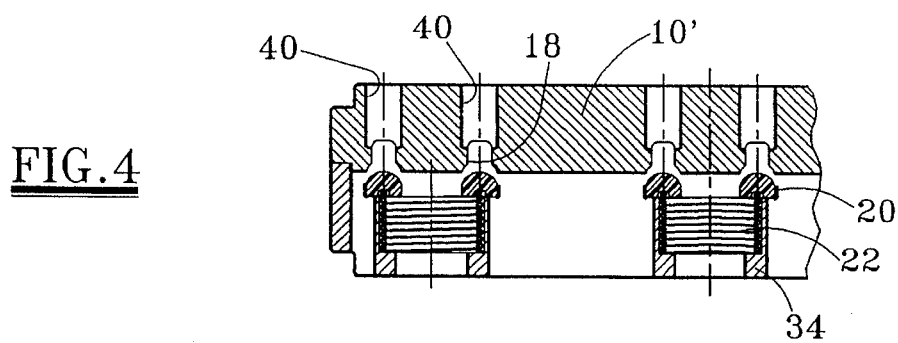
FIG. 4 is a partial longitudinal cross-sectional view of a second embodiment of valve according to the present invention.
Figure 5:
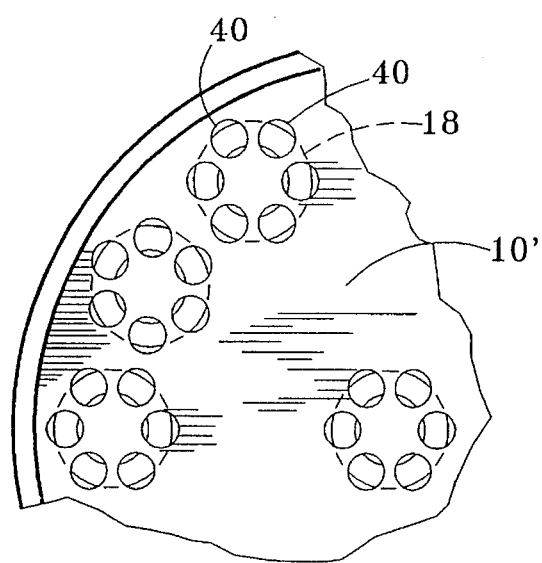
FIG. 5 is a partial top plan view of the embodiment of FIG. 4.

Referring next to FIGS. 4 and 5, there is shown a second embodiment of the invention, which is generally the same as the first embodiment, except that the holes 40 of the various clusters are cylindrical, rather than arcuate, and their sides do not taper along their lengths. The bottom plate 12, spring 22, and seal ring 20 are the same as in the first embodiment.

Figure 6:
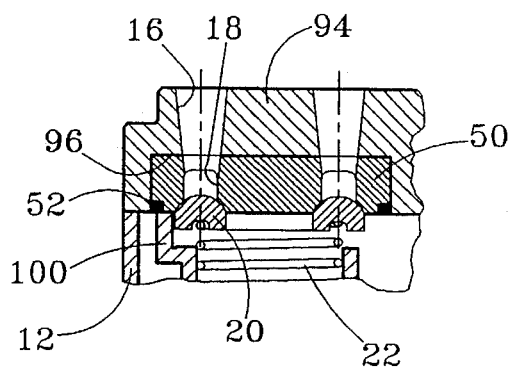
FIG. 6 is a detailed view of a modification of the embodiment of FIGS. 1–3 showing a removable seat member.

FIG. 6 shows a modification which could be applied to any of the above embodiments or other embodiments of the invention, but which, as shown, is applied to the embodiment of FIGS. 1–3. Specifically, the seating plate of FIG. 6 includes a metallic main body 94, with a plurality of recesses 96 in its inner side, each recess being generally aligned with a respective cluster of the arcuate slots 16. Within each recess 96 is fitted a seat member 50, e.g. of plastic, which defines the inner portions of the slots 16, as well as the annular aperture 18, including its seating surfaces. Together, the main body 96 and seat members 50 define a seating plate generally of the same configuration as that of FIGS. 1–3. However, adjacent the outer diameter of its inner side, each seat member 50 has an undercut which receives a resilient loading device such as an o-ring 52, which is oversized for the depth of the undercut. Thus, when the seating and guard plates are fixed together, the o-ting 52 is compressed between the seat member 50 and the guard plate 12 to firmly urge the seat member 50 into its recess 96. An advantage of this modification is that, if the seating surfaces become worn or damaged, they can be replaced by replacing the seat members 50, without the need to discard the entire seating plate.

Another modification of FIG. 6 is that three circumferentially spaced tabs, one of which is shown at 100, extended inwardly from the end of guide 34 to plat 10. Tabs 100 are sized to slidably engage the O.D. of ring 20 to provide positive mechanical guidance for its travel.

Figure 7:
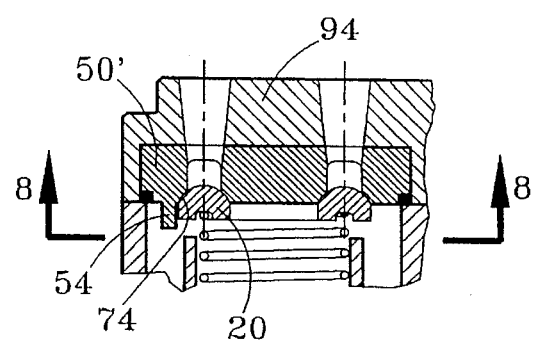
FIG. 7 is a view similar to that of FIG. 6 showing a second embodiment of the modified seat member, and corresponding changes in the guard plate.
Figure 8:
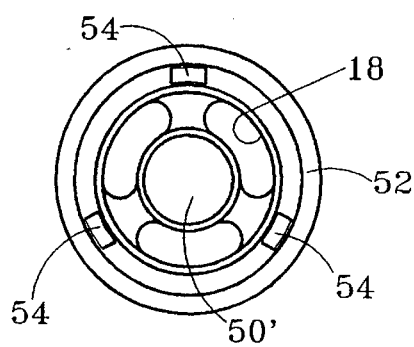
FIG. 8 is a view taken along the line 8—8 of FIG. 7 with the spring and seal ring removed.

FIGS. 7 and 8 show a further modification of the concept generally disclosed in FIG. 6. The main body 94 of the seating plate is identical to that of FIG. 6, except that its seat receiving recesses have been widened to receive a modified form 50' of the seat member. This member is not only wider, but includes three flanges or tabs 54 extending inwardly past the outer seating surface 74. These are positioned to slidably engage the outer diameter of ring 20 to provide mechanical guidance therefor. By placing these guides on the seat member 50', it can be ensured that the ring 20 will always properly align with its seating surfaces on the member 50', even if the latter should shift slightly laterally in its recess.

While the foregoing represent exemplary and currently preferred embodiments of the present invention, numerous modifications will suggest themselves to those of skill in the art. Accordingly, it is intended that the scope of the invention be limited only by the following claims.

I claim:

1. A valve for intake or exhaust of gas with respect to a compressor comprising:

a seating plate and a guard plate releasably attached in opposed relation;

the seating plate having a plurality of clusters of holes extending from an outer side of the seating plate thereinto, the holes of each cluster being arranged along a respective ring-shaped locus and communicating with respective seating surfaces opening through an inner side of the seating plate, the clusters being non-concentrically spaced from one another about the seating plate;

the guard plate defining a respective stop surface generally opposed to but spaced from the seating surfaces associated with each such cluster of holes, and having flow passages through the guard plate from an inner side thereof to an outer side thereof and communicating with the spaces between the stop surfaces and seating surfaces;

a respective seal ring reciprocable between each stop surface and the respective opposed seating surfaces and having sealing surfaces sized and shaped to engage and seal against the respective seating surfaces;

and a plurality of springs carried by the guard plate and each engaging a respective one of the seal rings to bias the seal ring toward the seating surfaces.

2. A device according to claim 1 wherein the ring-shaped locus is annular, and the seal ring is annular.

3. A device according to claim 2 wherein each of the springs is coaxial with the respective seal ring.

4. A device according to claim 3 wherein the spring is a helical coil spring with one end coil disposed in an annular groove in the seal ring and the other end coil engaging a spring reaction shoulder on the guard plate.

5. A device according to claim 4 wherein the guard plate has a respective cylindrical spring guide surface extending inwardly from each spring reaction shoulder and generally slidably engaging the outer diameter of the respective spring.

6. A device according to claim 3 wherein the guard plate has a respective cylindrical spring guide surface extending inwardly from each spring reaction shoulder and generally slidably engaging the outer diameter of the respective spring.

7. A device according to claim 6 wherein each spring guide surface defines a portion of a port forming one of the flow passages, the spring reaction shoulder being formed in the port between an outer end of the spring guide surface and a smaller diameter portion of the port extending through the outer side of the guard plate.

8. A device according to claim 7 comprising a respective one of the stop shoulders is disposed adjacent the inner end of each spring guide surface.

9. A device according to claim 8 wherein the stop shoulder is formed in the port between an inner end of the spring guide surface and a larger diameter portion of the port extending through the inner side of the guide plate.

10. A device according to claim 9 wherein the large diameter portion of the port is sized to slideably receive the respective seal ring.

11. A device according to claim 10 wherein the part of the guard plate defining the larger diameter portion of the port extends to abutment with the seating plate.

12. A device according to claim 2 wherein the sealing surfaces of each seal ring include an inner annular sealing surface adjacent the inner diameter of the ring and an outer annular sealing surface adjacent the outer diameter of the ring, the inner and outer sealing surfaces tapering toward each other.

13. A device according to claim 12 wherein the seating surfaces are tapered to mate with the respective sealing surfaces.

14. A device according to claim 13 wherein the inner ends of the holes of each cluster intersect a respective annular aperture extending through the inner side of the seating plate and defining the respective seating surfaces.

15. A device according to claim 14, wherein the holes are arcuate slots following the annular locus.

16. A device according to claim 2 wherein the inner ends of the holes of each cluster intersect a respective annular aperture extending through the inner side of the seating plate and defining the respective seating surfaces.

17. A device according to claim 16 wherein the holes are arcuate slots following the annular locus.

18. A device according to claim 14 wherein the seating plate comprises a main body and a plurality of seat members each removably mounted in a respective recess in the inner side of the main body and defining the seating surfaces for a respective such cluster of holes.

19. A device according to claim 18 wherein the seat member further defines the respective annular aperture.

20. A device according to claim 19 wherein the seat member further defines inner portions of the holes of the respective cluster.

21. A device according to claim 18 further comprising a resilient loading device compressed between each seat member and the guard plate to urge the seat member tightly into the respective recess.

22. A device according to claim 18 wherein the seat members are comprised of a hard plastic material.

23. A device according to claim 22 wherein the seal rings are comprised of a hard plastic material.

24. A device according to claim 2 wherein the seating plate comprises a main body and a plurality of seat members each removably mounted in a respective recess in the inner side of the main body and defining the seating surfaces for a respective such cluster of holes.

25. A device according to claim 24 further comprising a resilient loading device compressed between each seat member and the guard plate to urge the seat member tightly into the respective recess.

26. A device according to claim 25 wherein the seat members and seal rings are comprised of hard plastic materials.

27. A device according to claim 24 wherein each seat member has guide flanges extending inwardly adjacent the outer diameter of the seating surfaces and sized to slidably receive the respective seal ring.

28. A device according to claim 2 wherein the seating plate has respective guide flanges extending inwardly adjacent the outer diameter of the seating surfaces and sized to slidably receive the respective seal ring.

* * * * *